(12) United States Patent
Parker

(10) Patent No.: US 12,333,133 B2
(45) Date of Patent: Jun. 17, 2025

(54) SYSTEMS AND METHODS FOR IMPROVING GESTURE RECOGNITION IN RENDERING GRID-ALIGNED DIGITAL INK ON A DISPLAY

(71) Applicant: Microsoft Technology Licensing, LLC, Redmond, WA (US)

(72) Inventor: Jonathan Harry Parker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/795,163

(22) PCT Filed: Jan. 28, 2021

(86) PCT No.: PCT/US2021/015536
§ 371 (c)(1),
(2) Date: Jul. 25, 2022

(87) PCT Pub. No.: WO2021/158426
PCT Pub. Date: Aug. 12, 2021

(65) Prior Publication Data
US 2023/0060045 A1    Feb. 23, 2023

(30) Foreign Application Priority Data

Feb. 3, 2020    (LU) .......................................... 101625

(51) Int. Cl.
*G06F 3/04883*    (2022.01)
*G06V 30/142*    (2022.01)
*G06V 30/32*    (2022.01)

(52) U.S. Cl.
CPC ...... *G06F 3/04883* (2013.01); *G06V 30/1423* (2022.01); *G06V 30/32* (2022.01)

(58) Field of Classification Search
CPC ...... G06F 3/041; G06F 3/0412; G06F 3/0414; G06F 3/042; G06F 3/043; G06F 3/044;
(Continued)

(56) References Cited

U.S. PATENT DOCUMENTS 6,438,523 B1    8/2002    Oberteuffer et al.
2002/0150297 A1    10/2002    Gorbatov
(Continued)

FOREIGN PATENT DOCUMENTS

GB    2 446 203 A    8/2008

OTHER PUBLICATIONS

International Search Report issued in corresponding International Application No. PCT/US2021/015536 dated Apr. 20, 2021.
(Continued)

*Primary Examiner* — Ke Xiao
*Assistant Examiner* — Nelson Lam
(74) *Attorney, Agent, or Firm* — ArentFox Schiff LLP

(57) ABSTRACT

Examples described herein generally relate to rendering grid-aligned digital ink on a display of a computing device. In an example, the computing device determines grid pattern data associated with a grid pattern displayed on the display and a velocity of the input. Based the grid line pattern data and the velocity, the computing device may render digital ink that is traced along one or more grid lines of the grid pattern.

14 Claims, 7 Drawing Sheets

(58) Field of Classification Search
CPC .......... G06F 3/045; G06F 3/046; G06F 3/047; G06F 3/048; G06F 3/0487; G06F 3/0488; G06F 3/04883; G06V 30/32; G06V 30/1423
USPC .................................................. 345/173–179
See application file for complete search history.

(56) References Cited

U.S. PATENT DOCUMENTS

| | | | | |
|---|---|---|---|---|
| 2010/0182328 | A1* | 7/2010 | Pirchio | G06T 13/80 345/474 |
| 2011/0304643 | A1* | 12/2011 | Marison | G06T 11/203 345/611 |
| 2013/0120426 | A1* | 5/2013 | DiVerdi | G06T 11/001 345/589 |
| 2013/0229390 | A1* | 9/2013 | DiVerdi | G06F 3/0488 345/179 |
| 2013/0263027 | A1* | 10/2013 | Petschnigg | G06T 11/00 715/761 |
| 2014/0267431 | A1* | 9/2014 | Sheynblat | G06F 3/0346 345/659 |
| 2015/0254946 | A1* | 9/2015 | Mooney | G06F 3/03547 345/173 |
| 2016/0048318 | A1* | 2/2016 | Markiewicz | G06F 3/03545 345/173 |
| 2016/0092021 | A1* | 3/2016 | Tu | G06F 3/04883 345/173 |
| 2016/0267343 | A1* | 9/2016 | Qian | G06F 3/023 |
| 2017/0124735 | A1* | 5/2017 | Petschnigg | G06F 3/048 |
| 2022/0357843 | A1* | 11/2022 | Jia | G06F 3/04883 |
| 2023/0051541 | A1* | 2/2023 | Kim | G06F 3/04186 |

OTHER PUBLICATIONS

Anonymus: "Inkscape", Oct. 5, 2011, pp. 1-152, Retrieved from the internet: URL:https://archive.flossmanuals.net/inkscape/-booki/inkscape.pdf.
"Notice of Allowance Issued in European Patent Application No. 21707533.2", Mailed Date: Aug. 31, 2023, 7 Pages.
Decision to Grant Received for European Application No. 21707533.2, mailed on Nov. 30, 2023, 2 pages.

* cited by examiner

SYSTEMS AND METHODS FOR IMPROVING GESTURE RECOGNITION IN RENDERING GRID-ALIGNED DIGITAL INK ON A DISPLAY

CROSS-REFERENCE TO RELATED APPLICATION

This application is a 35 U.S.C. § 371 National Phase of PCT Application No. PCT/US2021/015536, filed Jan. 28, 2021, which claims the benefit of Luxembourg Patent Application No. LU101625, entitled "SYSTEMS AND METHODS FOR GRID-ALIGNED INKING" and filed on Feb. 3, 2020, which is expressly incorporated by reference herein in its entirety.

BACKGROUND

The present disclosure relates to a computer system, and more particularly, to systems and methods for grid-aligned inking.

Computer systems may provide techniques to draw and create shapes on a display. In an example, an input source such as a stylus, a finger, or a mouse may move across a display of a computing device to generate a line corresponding to a path moved by the input source. Typically, as a user attempts to draw a line on the display, without the use of a drawing tool, the line progressively diverges from an ideal line intended by the user. Further, when the user attempts to draw shapes or lines that require angles, the user is likely to over or under correct when turning a corner causing a rounded or inaccurate corner. Typical computer systems use tools such as virtual rulers, connecting dots, additional button/key presses, or other operations that require additional user interaction to draw an ideal line. However, some of these tools may require the user to learn new rules and paradigms that are not self-evident to the user. Further, some of these tools may require additional gestures by the user in order to complete a drawing thereby slowing down the speed of the user while drawing.

Thus, there is a need in the art for improvements in computer systems that provide drawings.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, method of grid-aligned inking includes determining grid pattern data associated with a grid pattern of a display canvas. The method also includes receiving a first input indicating an interaction with the display canvas at a first point on the display canvas. The method also includes selecting first grid line point on a first grid line of a plurality of grid lines of the grid pattern corresponding to the first point. The method also includes receiving a second input indicating a continuous interaction along the display canvas initiating from the first point and ending at a second point on the display canvas. The method also includes determining a velocity corresponding to the second input. The method also includes outputting a digital ink line traced along one or more grid lines of the plurality of grid lines between the first grid line point and a second grid line point corresponding to the second point based on the grid pattern data and the velocity, wherein the one or more grid lines includes the first grid line.

In another example, a computing device for grid-aligned inking includes a memory storing instructions, and a processor communicatively coupled with the memory. In the computing device, the processor is configured to determine grid pattern data associated with a grid pattern of a display canvas. The processor is also configured to receive a first input indicating an interaction with the display canvas at a first point on the display canvas. The processor is also configured to select first grid line point on a first grid line of a plurality of grid lines of the grid pattern corresponding to the first point. The processor is also configured to receive a second input indicating a continuous interaction along the display canvas initiating from the first point and ending at a second point on the display canvas. The processor is also configured to determine a velocity corresponding to the second input. The processor is also configured to output a digital ink line traced along one or more grid lines of the plurality of grid lines between the first grid line point and a second grid line point corresponding to the second point based on the grid pattern data and the velocity, wherein the one or more grid lines includes the first grid line.

In another aspect, an example computer-readable medium storing instructions for performing the methods describe herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
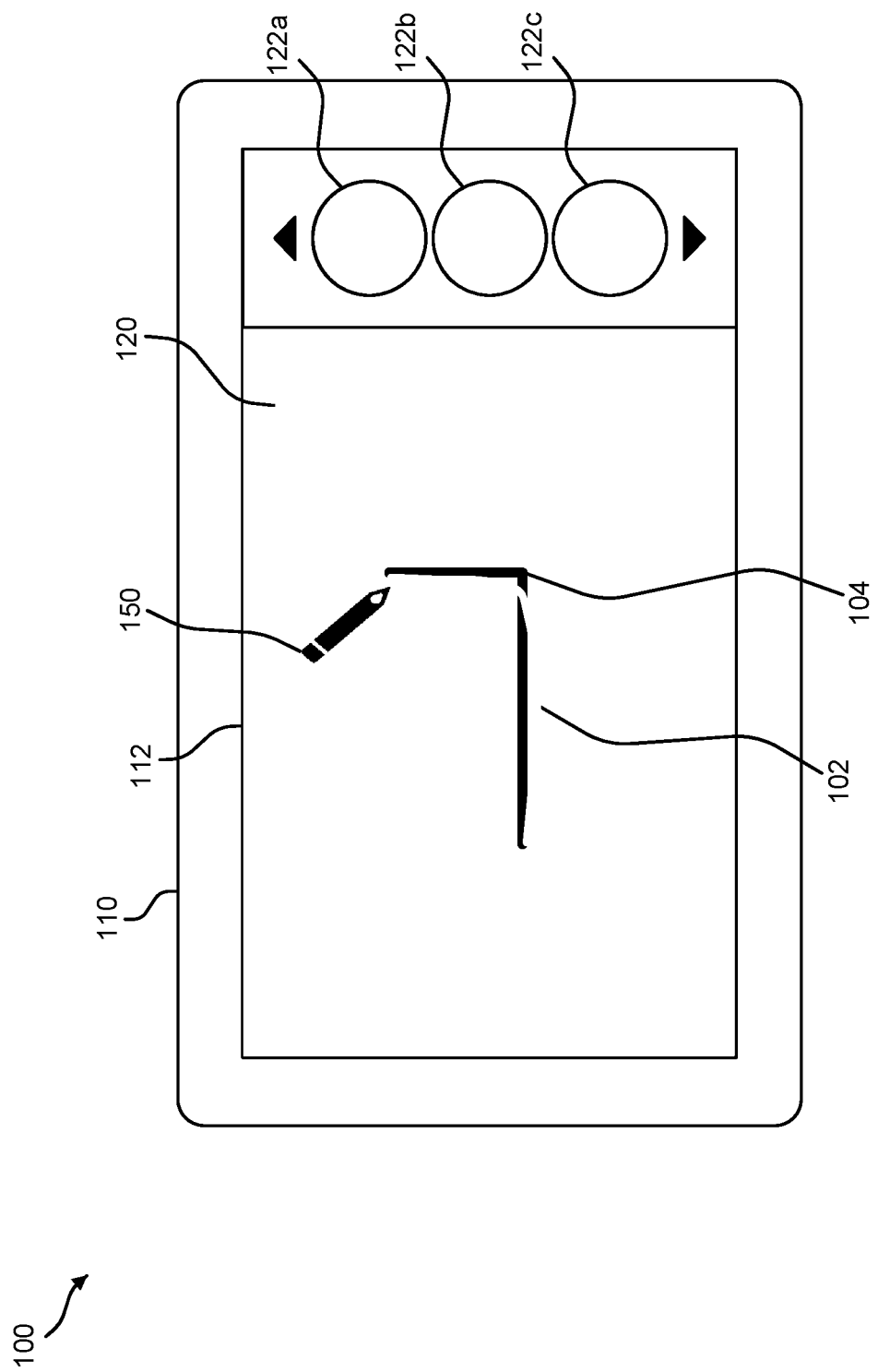
FIG. 1 is a diagram of an example computing device receiving input and outputting grid-aligned output, according to aspects of the present disclosure.

The present disclosure provides systems and methods for grid-aligned inking. In an example, the systems and methods are performed by a computing device configured to perform the grid-aligned inking via thresholded infinite impulse response filtering of drawing input velocity on a digital canvas. In an example, the computing device may be any one of a tablet, smart phone, a personal computer, a laptop, a touchscreen, a head-mounted display device, a scanning device, or any other computing device. The drawing input may correspond to an inking input signal from a digital pen, a stylus, a mouse, or a finger.

In an aspect, the computing device is configured to perform a plurality of operations for grid-aligned inking. In an example, the computing device is configured to determine grid pattern data associated with a grid pattern of a display canvas. The computing device is also configured to receive a first input indicating an interaction with the display canvas at a first point on the display canvas. The computing device is also configured to select a first grid line point on a first grid line of a plurality of grid lines of the grid pattern closest to the first point. The computing device is also configured to receive a second input indicating a continuous interaction along the display canvas initiating from the first point and ending at a second point on the display canvas. The computing device is also configured to determine a velocity corresponding to the second input. The computing device is also configured to determine a digital ink line traced along one or more grid lines of the plurality of grid lines between the first grid line point and a second grid line point corresponding to the second point based on the grid pattern data and the velocity, wherein the one or more grid lines includes the first grid line.

The systems and methods described herein provide techniques for faster and/or more accurate gesture recognition of user input drawings and reduction in processing load of a computing device when performing drawing recognition through grid-aligned inking. Further, the techniques described herein provide a simple interaction between the user and the computing device to generate a drawing resulting in a reduced number of gestures, rules, or paradigms required by the user to learn, as compared to the number of gestures, rules, or paradigms required when using a typical drawing application.

Turning now to the figures, examples of systems and methods for grid-aligned inking by a computing device are depicted. It is to be understood that aspects of the figures may not be drawn to scale and are instead drawn for illustrative purposes.

Referring to FIG. 1, an example computing system 100 includes a computing device 110 and an input source 150 (e.g., digital pen, stylus, mouse, or finger). The computing device 110 may be, for example, any mobile or fixed computing device including but not limited to a desktop, a laptop, a tablet computer, a cellular telephone, a gaming device, a mixed reality or virtual reality device (e.g., head-mounted display), a music device, a television, a navigation system, a camera, a personal digital assistant (PDA), a handheld device, any other computing device having wired and/or wireless connection capability with one or more other devices, or any other type of computerized device capable of receiving input corresponding to a line or drawing.

In an example, the computing device 110 includes a display 112. The display 112 may be a digitized surface such as a touch screen that performs both output of images and receives input from a user. The display 112 may include, for example, a digitizer for detecting a location of an interaction between the input source 150 and the display 112. For example, the digitizer may detect the location of a digital pen on the display 112 or a point of contact or near point of contact between the digital pen and the display 112. In some examples, the computing device 110 may detect the input source 150 (e.g., digital pen, stylus, or finger) hovering near the digitized surface and register a touch event upon an action such as clicking a button on the input source 150.

As illustrated in FIG. 1, the computing device 110 allows a user to generate a grid-aligned output 104 (e.g., digital ink line) based on a drawing input 102 on the display 112. In an example, the computing device 110 allows a grid pattern 122 (e.g., one of grid patterns 122a, 122b, or 122c) to be selected and displayed on a display canvas 120. Further, the drawing input 102 is received by the computing device 110 via the input source 150. In an example, the drawing input 102 indicates an interaction from the input source 150 with the display canvas 120 at a single point or indicates a continuous interaction between two points on the display canvas 120. As described in more detail herein, an example of an indication of continuous interaction may include a plurality of inputs (or a series of data points) received without the communication between the input source 150 and the display canvas 120 being disconnected. As described in more detail herein, the computing device 110 uses grid pattern data from the selected grid pattern 122 along with input data (e.g., input position and/or velocity) associated with the drawing input 102 to generate the grid-aligned output 104 that includes a drawing line traced along (e.g., aligned with or snapped to) one or more pattern lines from the grid pattern 122, as shown by FIG. 1.

It is noted that FIG. 1 illustrates the drawing input 102 being visible on the display 112. However, in some implementations of the computing device 110, the drawing input 102 may not be displayed or visible to a user.

In a typical computing device, drawing software may allow a user to attempt to draw a line with an input source without a drawing assist tool, but the user may typically experience some amount of unintended divergence from an ideal line intended by the user due to limitations of human motor function and eye-hand coordination. In an example, once the line drawn by the user diverges far enough to be noticeable, the user may attempt to correct the divergence resulting in a jagged or bowed line. Additionally, a user trying to draw diagrams, shapes, or angled lines may be likely to over-correct or under-correct when turning corners with the input source. This may result in rounded corners, inaccurate angles, or require the user to stop input from the input source (e.g., lift digital pen or finger from display and begin a new line.

To assist the user, a typical computing device includes drawing assist tools to provide the user with assistance when drawing lines, angles, curves, shapes, etc. For example, the drawing assist tools may include additional gestures or input (e.g., use of additional buttons being pushed by user or use of virtual ruler) to accomplish the intended drawing of the user. However, typical drawing assist tools have undesired effects. For example, some typical drawing assist tools feel unnatural due to the digital experience lacking the feel of pen and paper. In some examples, typical drawing assist tools require the user to learn new rules and paradigms that are not self-evident or that require multiple inputs (e.g., holding ctrl, shift, or alt while moving mouse). In some examples, typical drawing assist tools require a number of gestures to accomplish a drawing task which may increase, slowing speed of user's drawing. In some examples, typical drawing assist tools limit the length of a line or an angle formed in the line to specific increments (e.g., ink must snap to specific distances or angles).

Systems and methods of the present disclosure provide techniques for drawing lines, angles, curves, shapes, etc. through grid-aligned inking which may assist a user while drawing without the undesired effects of the typical computing device, as described above.

Figure 2:
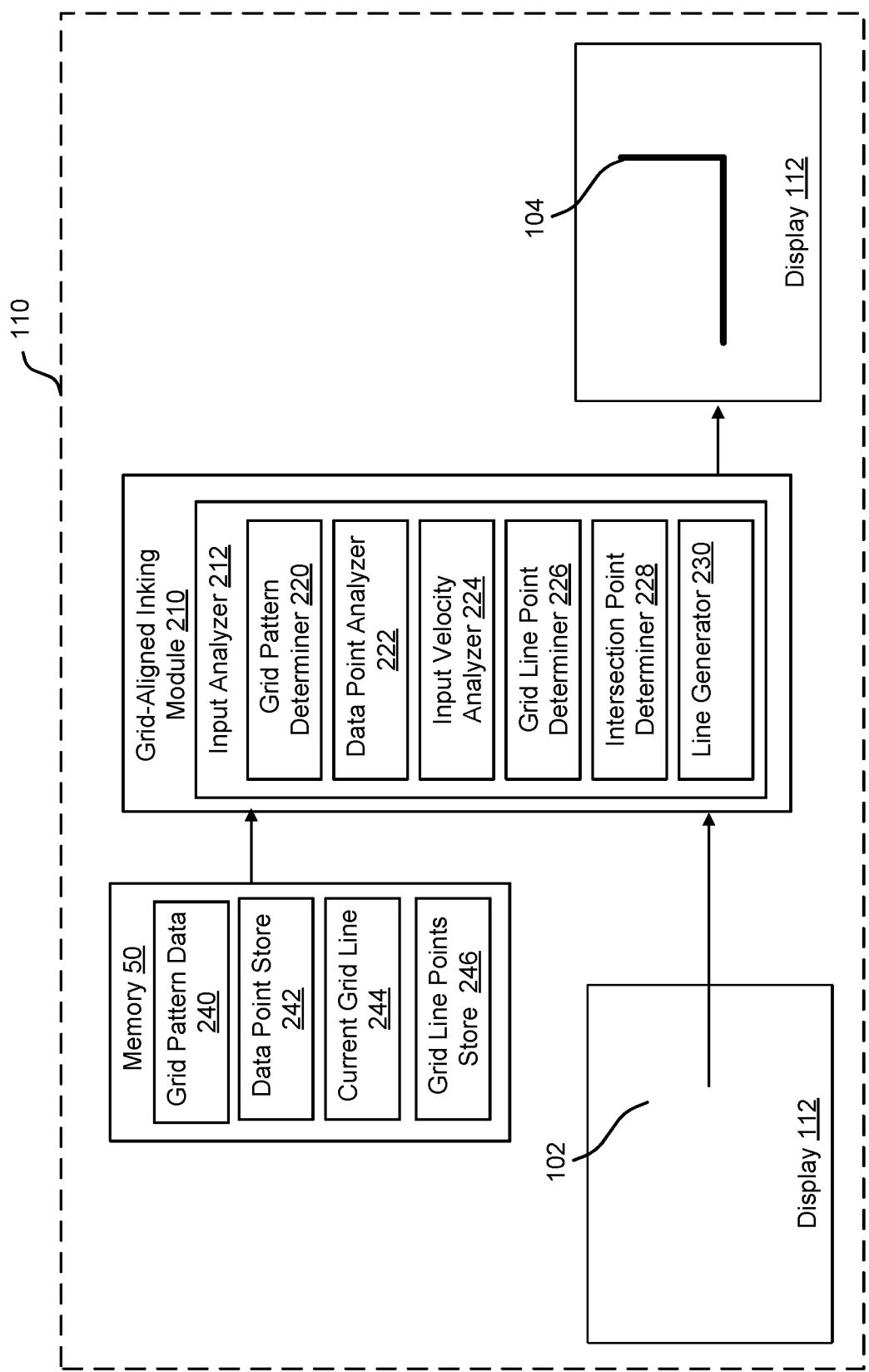
FIG. 2 is a block diagram of example aspects of the computing device of FIG. 1, according to aspects of the present disclosure.

Referring to FIG. 2, an example computing device 110 is disclosed, and described based on example implementations of FIGS. 3, 4, and 5A-5D. In an example, the computing device 110 includes a grid-aligned inking module 210 configured to perform grid-aligned inking. In an example, the grid-aligned inking module 210 includes an input analyzer 212. The input analyzer 212 is configured to analyze user input associated with the grid pattern 122 and the drawing input 102 and provide drawing data to the display 112 to display the grid pattern 122 and the grid-aligned output 104.

In a non-limiting example, the input analyzer 212 includes a grid pattern determiner 220 to determine a grid pattern 122 to be displayed on the display canvas 120 and grid pattern data 240 associated with the grid pattern 122 to be displayed or being displayed. In an example, the grid pattern determiner 220 receives an indication, such as signal, indicating a user selection or a default selection, of the grid pattern 122 to be displayed or being displayed. Based on the indication, the grid pattern determiner 220 may retrieve grid pattern data 240 corresponding to the grid pattern 122 from a memory 50 and/or user input.

The grid pattern data 240 may comprise data associated with a plurality of repeated line patterns of the grid pattern 122. In an example, a line pattern is defined by line characteristics, such as an angle of slope of lines or functions (e.g., sinusoidal function), of the line pattern and a distance between the repeated lines. For example, the grid pattern data 240 associated with a square grid pattern, as illustrated by FIG. 1, may include a first line pattern having a slope of 0 degrees spaced at 16 pixels, and a second line pattern having a slope of 90 degrees spaced at 16 pixels. In an example, the grid pattern data 240 is stored in memory 50 of the computing device 110. In another example, some or all of the grid pattern data 240 may be received from user input indicating different characteristics of the grid pattern 122 to be displayed. For example, the user input may include one or more of the slope or spacing between lines of the line pattern. The lines of the line patterns may include straight lines or curved lines. Further, line patterns of a grid pattern may be mixed to include different styles of line patterns (e.g., first line pattern includes straight lines, and second line pattern includes curved lines) used in a single grid pattern.

In an example, the grid pattern determiner 220 provides the grid pattern data 240 to the line generator 230 of the grid-aligned inking module 210 for display of the grid pattern 122 on the display 112 according to the grid pattern data.

In a non-limiting example, the grid-aligned inking module 210 also includes a data point analyzer 222 configured to determine data points and corresponding times from data of the drawing input 102. The data point analyzer 222 may capture positions of the input source 150 relative to the display canvas 120 to generate the data points and associate a time of capture to the data points. All data points and associated times may be stored in the data point store 242 of the memory 50. The data points may include x and y coordinate points associated with the display canvas 120 along with a corresponding time(s) at which the data points were received (e.g., corresponding time the input source 150 interacted with the display canvas 120 at the data point). In an example, the data point analyzer 222 may capture (or sample) the drawing input 102 at a timed interval (e.g., 240 samples/second). Due to the sampling rate, in an example, the data point analyzer 222 may generate more data points when the input source 150 is at a low velocity as compare to the input source 150 at a higher velocity.

Figure 3:
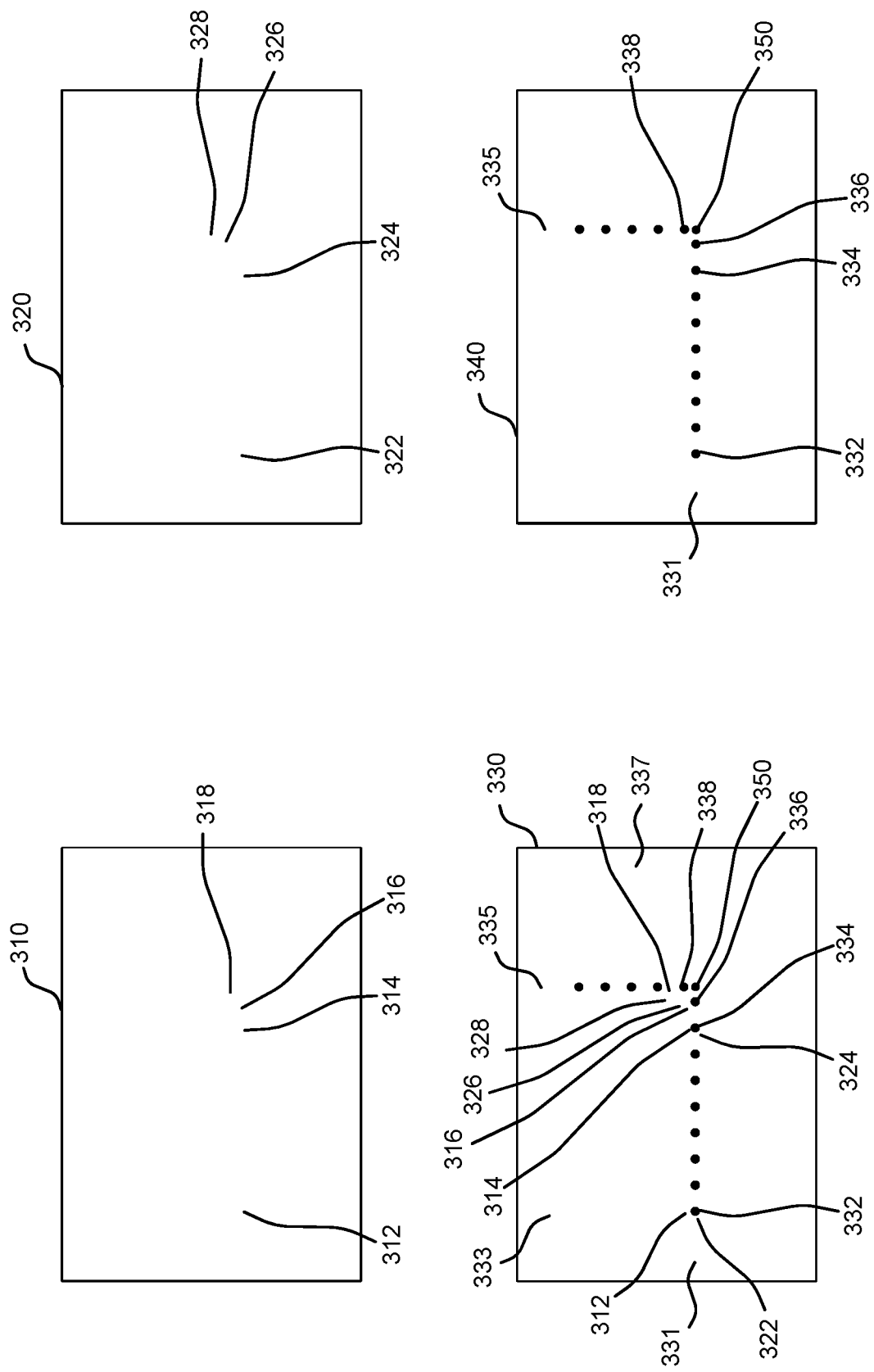
FIG. 3 is a diagram of example visual representations of a first scenario, according to aspects of the present disclosure.

Visual representation 310 of FIG. 3 corresponds to a first scenario where the drawing input 102 has a low velocity around the corner, as described in more detail herein. FIG. 3 illustrates data points 312-318, where the data point 312 corresponds to time t1, the data point 314 corresponds to time t2, the data point 316 corresponds to time t3, and the data point 318 corresponds to time t4, and t1<t2<t3<t4

In a non-limiting example, the grid-aligned inking module 210 also includes an input velocity analyzer 224 configured to determine a velocity of the input source 150 as the drawing input 102 is generated. For example, the input velocity analyzer 224 calculates a velocity of the input source 150 interacting with the display canvas 120 at a particular point.

Visual representation 320 of FIG. 3 for the first scenario illustrates one or more velocities 322-328 of the input source 150 corresponding to the drawing input 102. In an aspect, the velocity of the input source 150 at any given data point may be different from the velocity of the input source 150 at another given data point. For example, as shown by the visual representation 320, the velocity 322, which corresponds to the user attempting to draw a straight portion of the drawing input 102, may include a higher speed (as represented by longer dashes) than a speed of the velocities 324-328 (as represented by shorter dashes), which corresponds to a user attempting to draw the corner at a slow speed.

In an example, the input velocity analyzer 224 calculates a velocity vector, such as two-dimensional velocity vector, based on the data points (e.g., data points 312-318 of FIG. 3) over time (e.g., t1-t4). In an example, the input velocity analyzer 224 calculates the velocity vector using a thresholded infinite impulse response (IIR) filter. In some examples, alternate techniques for calculating velocity vectors may be used, such as Euler's method or a Kalman filter.

In an example, the input velocity analyzer 224 uses a low threshold and a high threshold to cap velocities to a low velocity value and a high velocity value. For example, in the case of a low threshold, the input velocity analyzer 224 may treat velocity of the input source 150 that is below the low threshold as if the input source 150 is moving at the low velocity value. This may indicate that the input source 150 is not moving in a specific direction, and therefore may result in a point being snapped to a closest grid line regardless of whether the grid line is horizontal or vertical. This may also allow a user to easily change directions due to the slow input source 150 speed. In the case of the high threshold, the input velocity analyzer 224 may limit velocities over the high threshold to the high velocity value (or maximum value) that is set by the grid-aligned inking module 210.

In a non-limiting example, the grid-aligned inking module 210 also includes a grid line point determiner 226 configured to determine one or more intended points (or grid line points) on a grid line corresponding to the data points of the drawing input 102. The grid line point determiner 226 may select an intended point on a grid line closest to a data point where the grid line has a direction that most closely matches the velocity of the input source 150. The grid line point determiner 226 may store all grid line points in grid line points store 246, along with associated data (e.g., corresponding data point data or velocity). In an example, the grid line point determiner 226 determines the closest grid lines to a data point based on grid pattern data and then determines which of the grid lines most closely match the direction of the velocity of the input source 150 at the data point.

Visual representation 330 of FIG. 3 illustrates the matching performed by the grid line point determiner 226. In an example, the grid line point determiner 226 calculates distances between the data point 312 and grid lines 331 and 333 of the grid pattern 122 that are near the data point 312, based on the grid pattern data 240. Based on the calculated distances, the grid line point determiner 226 then compares a function or a slope of the grid lines 331 and 333 to a direction of the velocity 322 associated with the data point 312, and generates (or snaps) a grid line point 332 on the grid line 331 based on the closest distance and the most closely matching function/slope of the grid line 331 to the direction of the velocity 322. In an example, the grid line point determiner 226 stores the grid line 331 as a current grid line 244 in the memory 50.

At a next data point (e.g., data point 314), the grid line point determiner 226 may repeat the operations of calculating distances to grid lines and comparing functions/slopes to generate the grid line point 334. Alternatively, the grid line point determiner 226 may avoid calculating distances and, instead, may compare a function/slope of the current grid line 244 (e.g., stored grid line 331) stored in memory 50 to a direction of the velocity 324 associated with the data point 314. If the function/slope of the current grid line 244 is within a directional threshold of the direction of velocity 324 (and/or, in some examples, input source 150 remains in a threshold distance to current grid line 244, even if closer to another grid line), the grid line point determiner 226 generates (or snaps) a grid line point 334 on the grid line 331.

Similarly, at a next data point (e.g., data point 316), the grid line point determiner 226 may continue to generate grid points (e.g., grid point 336) based on a corresponding velocity (e.g., velocity 326) of the input source 150 at the data point 316. As shown by the visual representation 330, the velocity (e.g., velocity 326) may be low while cornering (e.g., input source 150 moving slowly while making corner), therefore the grid line point 336 continues to generate grid points (e.g., grid point 336) that are representative to the intended point of the input source 150.

In an example, if the function/slope of the current grid line 244 does not most closely match the direction of velocity associated with the next data point (and/or, in some examples, input source 150 exceeds threshold distance to current grid line 244), the grid line point determiner 226 determines a new current grid line 244, based on the operations described above.

As shown by the visual representation 330 for the first scenario, at the data point 318, the grid line point determiner 226 determines the current grid line 244 does not most closely match the direction of the velocity 328. The grid line point determiner 226 may calculate distances between the data point 318 and grid lines 335 and 337 of the grid pattern 122 that are near the data point 318, based on the grid pattern data 240. Based on the calculated distances, the grid line point determiner 226 then compares a function or a slope of the grid lines 335 and 337 to a direction of the velocity 328 associated with the data point 318, and generates (or snaps) a grid line point 338 to the grid line 335 based on the closest distance and the most closely matching function/slope of the grid line 335 to the direction of the velocity 328.

In an example, the grid line point determiner 226 stores a new grid line 335 as the current grid line 244 in the memory 50.

In a non-limiting example, the grid-aligned inking module 210 also includes an intersection point determiner 228 configured to generate an intersection point based on a change in the current grid line 244. The intersection point determiner 228 may store all intersection points in the grid line points store 246, along with associated data (e.g., corresponding data point data, velocity, or intersecting grid lines data). In an example, the intersection point determiner 228 may monitor the current grid line 244 and if the current grid line changes from a first grid line (e.g., grid line 331) to a second grid line (e.g., grid line 335), the intersection point determiner 228 determines a closest intersection of these grid lines, and generates an intersection point 350 based on the closest intersection. In an example, the intersection point determiner 228 may monitor the current grid line 244 based on a bit change (e.g., change from 0 to 1, and vice versa means the current grid line 244 changed).

Visual representation 340 of FIG. 3 illustrates a plurality of grid line points (including grid line points 332-338) and the intersection point 350 generated by the grid line point determiner 226 and the intersection point determiner 228.

Figure 4:
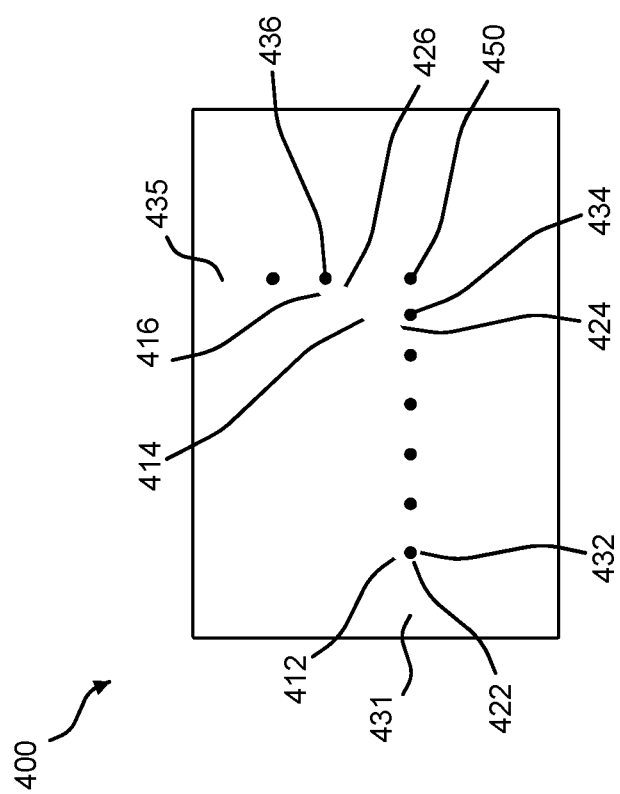
FIG. 4 is another diagram of example visual representations of second scenario, according to aspects of the present disclosure.

Visual representation 400 of FIG. 4 corresponds to a second scenario having a drawing input with a high velocity around a corner, as described in more detail herein. The visual representation 400 illustrates data points 412-416, where the data point 412 corresponds to time t10, the data point 414 corresponds to time t11, and the data point 416 corresponds to time t12, and t10<t11<t12.

In this second scenario, a set of velocities 422 of the input source 150 corresponds to the drawing input. In this example, the velocities 422 correspond to the user drawing straight portions and a curved portion of the drawing input at a single high speed (as represented by longer dashes).

Similar operations, as described herein, may be performed by the grid line point determiner 226 in the second scenario to generate the grid line points 432 and 434 on the grid line 431 based on the data points 412 and 414 and the velocity 422. Further, the grid line point determiner 226 may recognize a change to the grid line 435, using similar operations described herein, and generate grid line point 436 on the grid line 435 based on the data point 416 and the corresponding velocity from the set of velocities 422, and the intersection point determiner 228 may generate intersection 450 at the intersection of grid lines 431 and 435.

Use of grid pattern data, grid points, and intersection points by the computing device 110 provide faster and/or more accurate gesture recognition of user input drawings and allow for a reduction in processing load of the computing device 110, as compared to a computing device that implements a typical drawing program.

In a non-limiting example, the grid-aligned inking module 210 also includes a line generator 230 configured to generate a line to connect grid line points. In a first example, if a first and second grid line points are on the same grid lines, a line is drawn to connect the first and second grid line points. For example, in the first scenario, when the grid line point 334 is generated, the line generator 230 compares the grid line associated with the grid line points 332 and 334 and determines the grid line points 332 and 334 are on the same grid line (grid line 331). Since these two grid line points are on the same grid line, the line generator 230 traces a line along the grid line 331 to connect the two grid line points to form the digital ink line 104a of FIG. 5A. Since grid line points 334 and 336 are on the same grid line, the line generator 230 traces a line along the grid line 331 to connect these two grid line points to form the digital ink line 104*b* of FIG. 5B. Similar operations may be performed for the second scenario.

In a second example, if first and second grid line points are on different grid lines, the line generator 230 generates an intersection between the two grid line points. For example, in the first scenario, when the grid line point 338 is generated, the line generator 230 compares the grid line associated with the grid line points 336 and 338 and determines the grid line points 336 and 338 are on different grid lines (grid lines 331 and 335, respectively). Since these two grid line points are on different grid lines, the line generator 230 obtains data for the intersection point 350 and traces a first portion of a line along the grid line 331 connecting the grid line point 336 to the intersection point 350, and also traces a second portion of the line along the grid line 335 connecting the intersection point 350 and the grid line point 338 to form the digital ink line 104*c* of FIG. 5C.

Figure 5A:
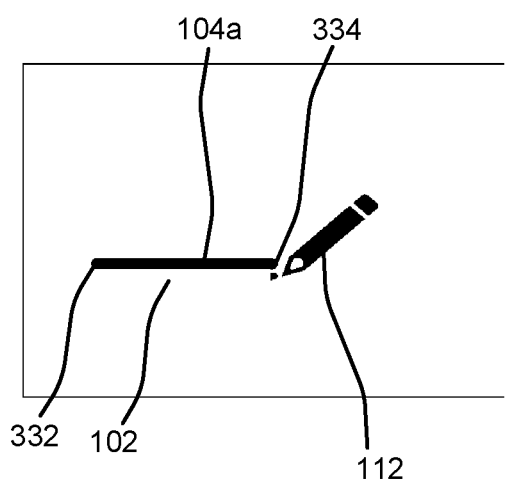
FIGS. 5A-5D are additional diagrams of example visual representations of aspects of the computing device of FIG. 1, according to aspects of the present disclosure.
Figure 5B:
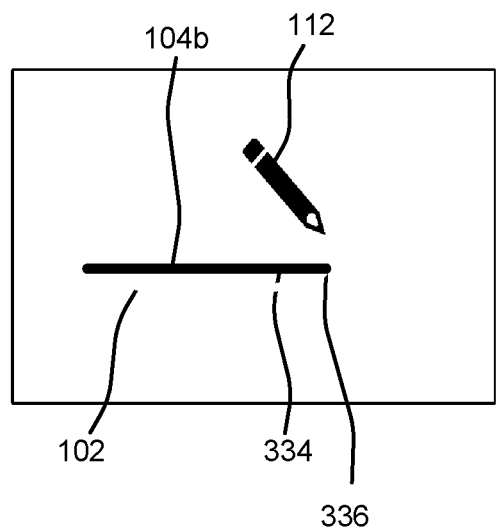
Figure 5C:
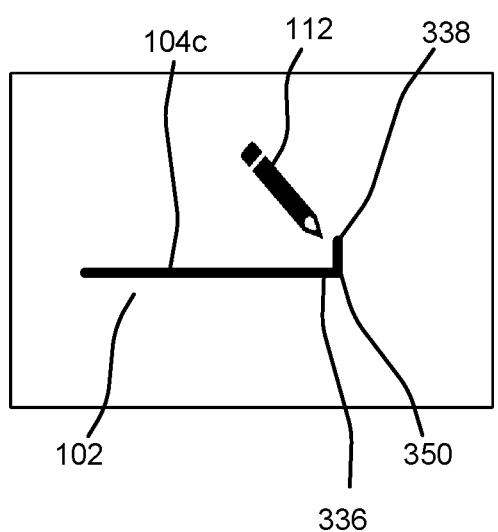
Figure 5D:
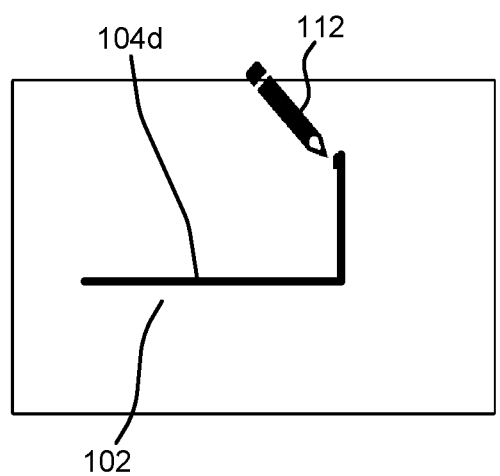

Further, the line generator 230 may continue to perform the operations, as described herein, to form the digital ink line 104*d* (which defines the grid-aligned output 104), as illustrated by FIG. 5D. Similar operations may be performed for the second scenario.

In an example, the line generator 230 provides data of grid line points and/or the lines to the display 112 to display the grid-aligned output 104 on the grid pattern 122.

Further, as shown by FIGS. 5A-5D, operations of the grid-aligned output 104 happen in real time as the input source 150 interacts with the display 112 (e.g., the user draws a stroke). As shown by FIG. 5A, the computing device 110 may generate and display the line 104*a* at time t2, which is the time the data point 314 is received, the line 104*b* at time t3, which is the time the data point 316 is received, the line 104*c* at time t4, which is the time the data point 316 is received, and the line 104*d* at some time greater than t4 when a next data point is received.

In an aspect, the grid pattern 122 may be changed based on a subsequent input, and new lines, drawings, etc. may align to a new grid pattern. For example, after a first grid-aligned inking is displayed by the computing device 110, the computing device 110 may receive a subsequent input to switch grid patterns (e.g., switch from square pattern 122*a* to triangle pattern 122*b*). In response to the subsequent input, any drawing input will display a second grid-aligned inking that is grid-aligned to the new grid pattern (e.g., triangle pattern 122*b*).

Figure 6:
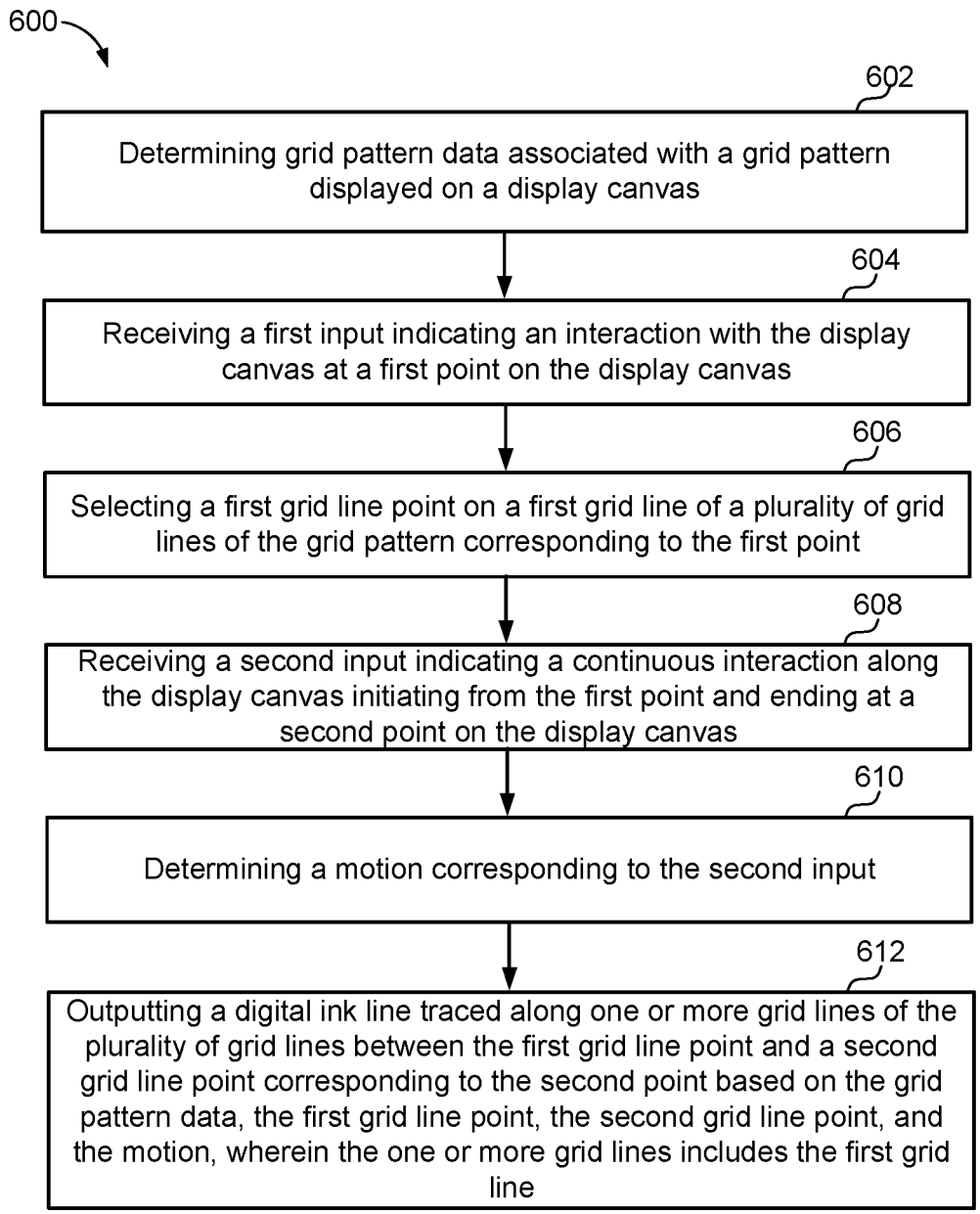
FIG. 6 is a flowchart of an example method of grid-aligned inking performed by the computing device of FIG. 1, according to aspects of the present disclosure.

Referring now to FIG. 6, an example method 600 for grid-aligned inking is disclosed. In an example, operations of the method 600 are performed by the computing device 110, including one or more components (e.g., components of FIGS. 2, and/or 4) of the computing device 110, based on the computing device 110 receiving the drawing input 102.

At 602, the example method 600 includes determining grid pattern data associated with a grid pattern of a display canvas. For example, one or more of a processor 48 (including grid-aligned inking module 210), a user interface 56 (including display 112), an operating system 140, or an application 160 determine the grid pattern data 240 associated with the grid pattern 122 of the display canvas 120, as described in detail above. In an example, the grid pattern data 240 comprises data associated with a plurality of repeated line patterns. In an example, a line pattern of the plurality of repeated line patterns is defined by an angle of slope of lines of the line pattern and a distance between the lines At 604, the example method 600 also includes receiving a first input indicating an interaction with the display canvas at a first point on the display canvas. In a first example, one or more of the processor 48 (including grid-aligned inking module 210), the user interface 56 (including display 112), the operating system 140, or the application 160 receive the drawing input 102 (first input) indicating an interaction with the display canvas 120 at the data point 312 (first point) on the display canvas 120. In a second example, the drawing input 102 (first input) indicating an interaction with the display canvas 120 at the data point 314 (first point) is received.

At 606, the example method 600 also includes selecting a first grid line point on a first grid line of a plurality of grid lines of the grid pattern corresponding to the first point. In the first example, one or more of the processor 48 (including grid-aligned inking module 210), the operating system 140, or the application 160 selects the grid line point 332 (first grid line point) on the grid line 331 (first grid line) of the grid pattern 122 corresponding to the data point 312 (first point). In the second example, the grid line point 334 (first grid line point) on the grid line 331 (first grid line) is selected.

In an example, the method 600 may also include determining the first grid line point corresponds to a point on one of the plurality of grid lines closest to the first point. In the first example or the second example, one or more of the processor 48 (including grid-aligned inking module 210), the operating system 140, or the application 160 determines the grid line point 332 or 334 corresponds to a point on one of the plurality of grid lines closest to the data point 312 or 314.

In an example, the method 600 may include outputting a first digital ink dot at the first grid line point on the first grid line in response to the selecting the first grid line point on the first grid line. For example, one or more of the processor 48 (including grid-aligned inking module 210), the operating system 140, the user interface 56 (including the display 112), or the application 160 output a digital ink dot at the grid line point 332 or 334 in response to the selecting the grid line point 332 or 334 on the grid line 331.

At 608, the example method 600 also includes receiving a second input indicating a continuous interaction along the display canvas initiating from the first point and ending at a second point on the display canvas. In the first example, one or more of the processor 48 (including grid-aligned inking module 210), the operating system 140, or the application 160 receives (or continues to receive) drawing input 102 (second input) indicating a continuous interaction along the display canvas 120 initiating from the data point 312 (first point) and ending at the data point 314 (second point) on the display canvas 120. In the second example, the drawing input 102 (second input) indicates a continuous interaction along the display canvas 120 initiating from the data point 314 (first point) and ending at the data point 316 (second point).

At 610, the example method 600 also includes determining a velocity corresponding to the second input. In the first example, one or more of the processor 48 (including grid-aligned inking module 210), the user interface 56 (including display 112), the operating system 140, or the application 160 determine velocity 322 corresponding to the data point 312. In the second example, the velocity 324 is determined.

In an example, the velocity is determined by calculating a velocity vector corresponding to the second input. For example, one or more of the processor 48 (including grid-aligned inking module 210), the user interface 56 (including display 112), the operating system 140, or the application 160 calculate a velocity vector corresponding to velocities 322 or 324 corresponding to the second input. The velocity vector may be calculated using an IIR filter. In an example, the velocity vector is a two-dimensional velocity vector.

At 612, the example method 600 also includes outputting a digital ink line traced along one or more grid lines of the plurality of grid lines between the first grid line point and a second grid line point corresponding to the second point based on the grid pattern data and the velocity, wherein the one or more grid lines includes the first grid line. In the first example, one or more of the processor 48 (including grid-aligned inking module 210), the user interface 56 (including display 112), the operating system 140, or the application 160 outputs the grid-aligned output 104 (digital ink line) traced along the grid line 331 between the grid line point 332 (first grid line point) and the grid line point 334 (second grid line point) based on the grid pattern data 240 and the velocities 322 and 324. In the second example, the outputting includes the grid-aligned output 104 (digital ink line) traced along the grid lines 331 and 335 between the grid line point 334 (first grid line point) and the grid line point 338 (second grid line point) based on the grid pattern data 240 and the velocities 324 and 328.

In an example, the method 600 also include comparing a velocity vector of the velocity to slopes of one or more of the plurality of grid lines, wherein the digital ink line is traced along the first grid line based on an angle of the velocity vector being closest to a function or a slope of the first grid line. In the first or second examples, one or more of the processor 48 (including grid-aligned inking module 210), the user interface 56 (including display 112), the operating system 140, or the application 160 compares a velocity vector corresponding to the velocity 324 or 328 to the grid pattern data 240 containing data on slopes of the grid pattern 122. The grid-aligned output 104 is traced along the grid line 331 based on an angle of the velocity vector corresponding to the velocity 322 being closest to a slope of the grid line 331, or traced along the grid line 335 based on an angle of the velocity vector corresponding to the velocity 328 being closest to a slope of the grid line 335.

In an example, the method 600 may also include determining a velocity vector of the velocity corresponds to the first grid line; selecting the second grid line point on the first grid line based on the velocity vector; and outputting the digital ink line traced along the first grid line between the first grid line point and the second grid line point based on the velocity vector. For example, one or more of the processor 48 (including grid-aligned inking module 210), the user interface 56 (including display 112), the operating system 140, or the application 160 determines the velocity vector corresponding to the velocity 324 corresponds to the grid line 331, selects grid line point 334 on the grid line 331 based on the velocity vector corresponding to the velocity 324, and outputs the grid-aligned output 104 traced along the grid line 331 between grid line points 332 and 334.

In an example, the method 600 may also include determining a velocity vector of the velocity corresponds to a second grid line of the plurality of grid lines; selecting the second grid line point on the second grid line based on the velocity vector; and outputting the digital ink line traced along the first grid line and along the second grid line between the first grid line point and the second grid line point. For example, one or more of the processor 48 (including grid-aligned inking module 210), the user interface 56 (including display 112), the operating system 140, or the application 160 determines the velocity vector corresponding to the velocity 328 corresponds to the grid line 335, selects the grid line point 338 on the grid line 335 based on the velocity vector corresponding to the velocity 328, and outputs the grid-aligned output traced along the grid lines 331 and 335 between grid line points 336 and 338.

In an example, the method 600 may also include determining an intersection point between the first grid line and the second grid line; outputting a first portion of the digital ink line traced along the first grid line between the first grid line point and the intersection point; and outputting a second portion of the digital ink line traced along the second grid line between the intersection point and the second grid line point. For example, one or more of the processor 48 (including grid-aligned inking module 210), the user interface 56 (including display 112), the operating system 140, or the application 160 determines the intersection point 350 between the grid lines 331 and 335; outputs a first portion of the grid-aligned output 104 traced along the grid line 331 between the grid line point 336 and the intersection point 350; and outputs a second portion of the grid-aligned output 104 traced along the grid line 335 between the intersection point 350 and the grid line point 338.

Figure 7:
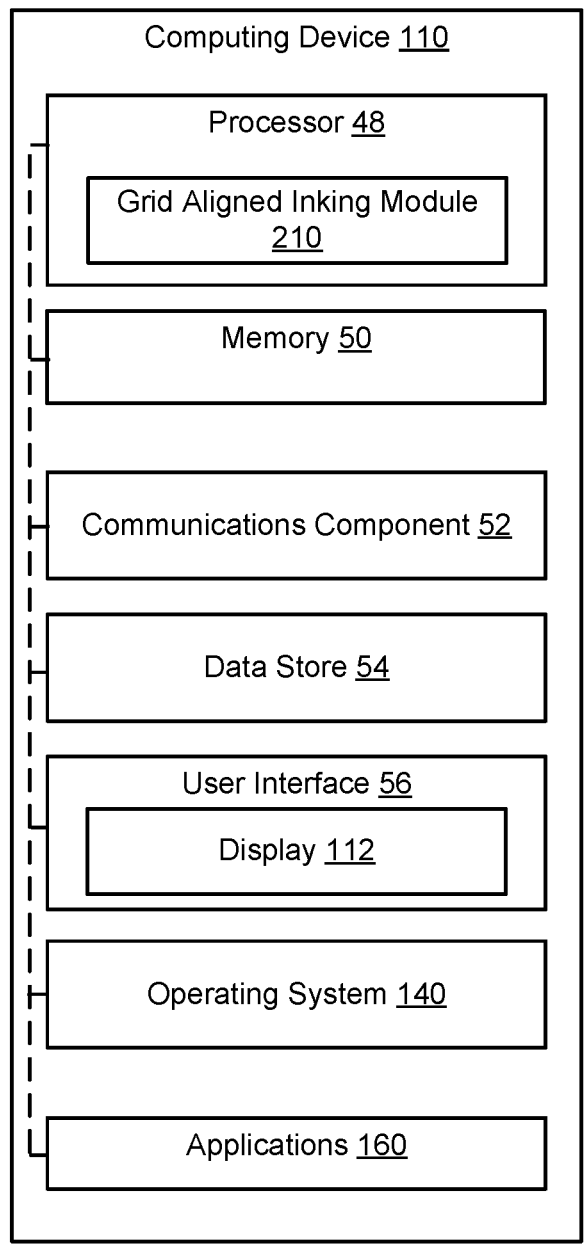
FIG. 7 is a schematic block diagram of example components of the computing device of FIG. 1, according to aspects of the present disclosure.

Referring now to FIG. 7, an example of the computing device 110 in accordance with an implementation includes additional component details as compared to FIG. 2. In one example, the computing device 110 includes the processor 48 for carrying out processing functions associated with one or more of components and functions described herein. The processor 48 can include a single or multiple set of processors or multi-core processors. Moreover, the processor 48 may be implemented as an integrated processing system and/or a distributed processing system. In an example, the processor 48 includes, but is not limited to, any processor specially programmed as described herein, including a controller, microcontroller, a computer processing unit (CPU), a graphics processing unit (GPU). an application specific integrated circuit (ASIC), a field programmable gate array (FPGA), a system on chip (SoC), or other programmable logic or state machine. Further, the processor 48 may include other processing components such as one or more arithmetic logic units (ALUs), registers, or control units.

In an example, the computing device 110 also includes the memory 50 for storing instructions executable by the processor 48 for carrying out the functions described herein. The memory 50 may be configured for storing data and/or computer-executable instructions defining and/or associated with the operating system 140 and/or grid-aligned inking module 104 and/or one or more applications 160, and the processor 48 may execute the operating system 140 and/or the grid-aligned module 210 and/or the one or more applications 160. An example of memory 50 may include, but is not limited to, a type of memory usable by a computer, such as random access memory (RAM), read only memory (ROM), tapes, magnetic discs, optical discs, volatile memory, non-volatile memory, and any combination thereof. In an example, the memory 50 may store local versions of applications being executed by processor 48.

The example computing device 110 also includes a communications component 52 that provides for establishing and maintaining communications with one or more parties utilizing hardware, software, and services as described herein. The communications component 52 may carry communications between components on the computing device 110, as well as between the computing device 110 and external devices, such as devices located across a communications network and/or devices serially or locally connected to the computing device 110. For example, the communications component 52 may include one or more buses, and may further include transmit chain components and receive chain components associated with a transmitter and receiver, respectively, operable for interfacing with external devices. In an implementation, for example, the communications component 52 may include a connection to communicatively couple the input source 150 to the processor 48.

The example computing device 110 also includes a data store 54, which may be any suitable combination of hardware and/or software, that provides for mass storage of information, databases, and programs employed in connection with implementations described herein. For example, the data store 54 may be a data repository for the operating system 140 and/or the applications 160.

The example computing device 110 also includes a user interface component 56 operable to receive inputs from a user of the computing device 110 and further operable to generate outputs for presentation to the user. The user interface component 56 may include one or more input devices, including but not limited to a keyboard, a number pad, a mouse, a touch-sensitive display (e.g., display 112), a digitizer, a navigation key, a function key, a microphone, a voice recognition component, any other mechanism capable of receiving an input from a user, or any combination thereof. Further, the user interface component 56 may include one or more output devices, including but not limited to a display (e.g., display 112), a speaker, a haptic feedback mechanism, a printer, any other mechanism capable of presenting an output to a user, or any combination thereof.

In an implementation, the user interface component 56 may transmit and/or receive messages corresponding to the operation of the operating system 140 and/or the applications 160. In addition, the processor 48 executes the operating system 140 and/or the applications 160, and the memory 50 or the data store 54 may store them.

While the grid-aligned inking module 210 is illustrated as part of the processor 48, implementations of the present disclosure are not limited to this example, In other examples, the grid-aligned inking module 210 or one or more of the subcomponents (e.g., grid pattern determiner 220, data point analyzer 222, input velocity analyzer 224, grid line point determiner 226, intersection point determiner 228, and/or line generator 230) of the grid-aligned inking module 210 may be implemented in one or more components/subcomponents of the computing device 110. For example, one or more of the subcomponents of the grid-aligned inking module 210 may be implemented in one or more of the processor 48, the application 160, the operating system 140, and/or the user interface 56 such that the subcomponents of the grid-aligned inking module 210 are spread out between the components/subcomponents of the computing device 110.

Further Examples and Implementations

An example method of grid-aligned inking, comprising: determining grid pattern data associated with a grid pattern of a display canvas; receiving a first input indicating an interaction with the display canvas at a first point on the display canvas; selecting a first grid line point on a first grid line of a plurality of grid lines of the grid pattern corresponding to the first point; receiving a second input indicating a continuous interaction along the display canvas initiating from the first point and ending at a second point on the display canvas; determining a velocity corresponding to the second input; and outputting a digital ink line traced along one or more grid lines of the plurality of grid lines between the first grid line point and a second grid line point corresponding to the second point based on the grid pattern data and the velocity, wherein the one or more grid lines includes the first grid line.

The example method above, wherein the determining the velocity corresponding to the second input comprises: calculating a velocity vector corresponding to the second input.

One or more of the example methods above, wherein the calculating the velocity vector is performed using an infinite impulse response (IIR) filter.

One or more of the example methods above, wherein the velocity vector is a two-dimensional velocity vector.

One or more of the example methods above, further comprising: comparing a velocity vector of the velocity to slopes of one or more of the plurality of grid lines, wherein the digital ink line is traced along the first grid line based on an angle of the velocity vector being closest to a slope of the first grid line.

One or more of the example methods above, further comprising: determining, by the processor, a velocity vector of the velocity corresponds to the first grid line; selecting, by the processor, the second grid line point on the first grid line based on the velocity vector; and outputting, by the processor, the digital ink line traced along the first grid line between the first grid line point and the second grid line point based on the velocity vector.

One or more of the example methods above, further comprising: determining, by the processor, a velocity vector of the velocity corresponds to a second grid line of the plurality of grid lines; selecting, by the processor, the second grid line point on the second grid line based on the velocity vector; and outputting, by the processor, the digital ink line traced along the first grid line and along the second grid line between the first grid line point and the second grid line point.

One or more of the example methods above, further comprising: determining an intersection point between the first grid line and the second grid line; outputting a first portion of the digital ink line traced along the first grid line between the first grid line point and the intersection point; and outputting a second portion of the digital ink line traced along the second grid line between the intersection point and the second grid line point.

One or more of the example methods above, wherein the selecting the first grid line point on the first grid line comprises: determining the first grid line point corresponds to a point on one of the plurality of grid lines closest to the first point.

One or more of the example methods above, wherein the selecting the first grid line point on the first grid line further comprises: calculating distances in a coordinate space of the display canvas from the first point to points on two or more grid lines of the plurality of grid lines; identifying a shortest distance of the distances corresponds to the first grid line point; and selecting, from the two or more grid lines, the first grid line based on the shortest distance.

One or more of the example methods above, further comprising: outputting a first digital ink dot at the first grid line point on the first grid line in response to the selecting the first grid line point on the first grid line.

One or more of the example methods above, wherein the grid pattern data comprises data associated with a plurality of repeated line patterns.

One or more of the example methods above, wherein a line pattern of the plurality of repeated line patterns is defined by an angle of slope of lines of the line pattern and a distance between the lines.

An example computing device for grid-aligned inking, comprising: a memory storing instructions; and a processor communicatively coupled with the memory and configured to perform operations of any of the example methods above.

An example computer-readable medium storing instructions for performing operations of any of the example methods above.

An example apparatus for grid-aligned inking comprising means for performing operations of any of the example methods above.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of grid-aligned inking, comprising:
   determining, by a processor, grid pattern data associated with a grid pattern of a display canvas;
   receiving, by the processor, a first input indicating an interaction with the display canvas at a first point on the display canvas;
   selecting, by the processor, a first grid line point on a first grid line of a plurality of grid lines of the grid pattern corresponding to the first point;
   receiving, by the processor, a second input indicating a continuous interaction via an input source along the display canvas initiating from the first point and ending at a second point on the display canvas;

determining, by the processor, a velocity of the input source interacting with the display canvas during the second input;

determining, by the processor, a velocity vector of the velocity corresponds to a second grid line of the plurality of grid lines;

comparing the velocity vector of the velocity to slopes of one or more of the plurality of grid lines;

selecting, by the processor, a second grid line point on the second grid line based on the velocity vector; and outputting, by the processor, a digital ink line traced along the first grid line and along the second grid line between the first grid line point and the second grid line point based on an angle of the velocity vector being closest to a slope of the first grid line.

2. The method of claim 1, wherein the determining the velocity corresponding to the second input comprises:

calculating the velocity vector corresponding to the second input.

3. The method of claim 2, wherein the calculating the velocity vector is performed using an infinite impulse response (IIR) filter.

4. The method of claim 2, wherein the velocity vector is a two-dimensional velocity vector.

5. The method of claim 1, further comprising:

determining an intersection point between the first grid line and the second grid line;

outputting a first portion of the digital ink line traced along the first grid line between the first grid line point and the intersection point; and outputting a second portion of the digital ink line traced along the second grid line between the intersection point and the second grid line point.

6. The method according to claim 1, further comprising:

capping velocities to a low velocity value and a high velocity value using a low threshold and a high threshold; and in response to determining that the second input is at the low velocity value, snapping a point to a closest grid line.

7. The method of claim 6, wherein the selecting the first grid line point on the first grid line comprises:

determining the first grid line point corresponds to a point on one of the plurality of grid lines closest to the first point.

8. The method of claim 7, wherein the selecting the first grid line point on the first grid line further comprises:

calculating distances in a coordinate space of the display canvas from the first point to points on two or more grid lines of the plurality of grid lines;

identifying a shortest distance of the distances corresponds to the first grid line point; and selecting, from the two or more grid lines, the first grid line based on the shortest distance.

9. The method of claim 6, further comprising:

outputting a first digital ink dot at the first grid line point on the first grid line in response to the selecting the first grid line point on the first grid line.

10. The method of claim 6, wherein the grid pattern data comprises data associated with a plurality of repeated line patterns.

11. The method of claim 10, wherein a line pattern of the plurality of repeated line patterns is defined by an angle of slope of lines of the line pattern and a distance between the lines.

12. The method of claim 10, further comprising:

determining, by a processor, grid pattern data associated with a new grid pattern of a display canvas;

receiving, by the processor, a third input indicating an interaction with the display canvas at a third point on the display canvas;

selecting, by the processor, a first grid line point on a first grid line of a plurality of grid lines of the new grid pattern corresponding to the third point;

receiving, by the processor, a fourth input indicating a continuous interaction along the display canvas initiating from the third point and ending at a fourth point on the display canvas;

determining, by the processor, a velocity corresponding to the fourth input;

determining, by the processor, a velocity vector of the velocity corresponds to a second grid line of the plurality of grid lines of the new grid pattern;

selecting, by the processor, the second grid line point on the second grid line of the plurality of grid lines of the new grid pattern based on the velocity vector; and outputting, by the processor, a digital ink line traced along the first grid line of the plurality of grid lines of the new grid pattern and along the second grid line of the plurality of grid lines of the new grid pattern between the third grid line point and the fourth grid line point.

13. A computing device for grid-aligned inking, comprising:

a memory storing instructions;

a processor communicatively coupled with the memory and configured to perform the method of claim 1.

14. A non-transitory computer-readable medium storing instructions for performing the method of claim 1.

* * * * *